Sept. 24, 1968
J. L. A. SEE
3,402,787
SELF-SUPPORTING ELEMENTS FOR ERECTING
DISMANTLEABLE CONSTRUCTIONS
Filed Aug. 29, 1966
5 Sheets-Sheet 1
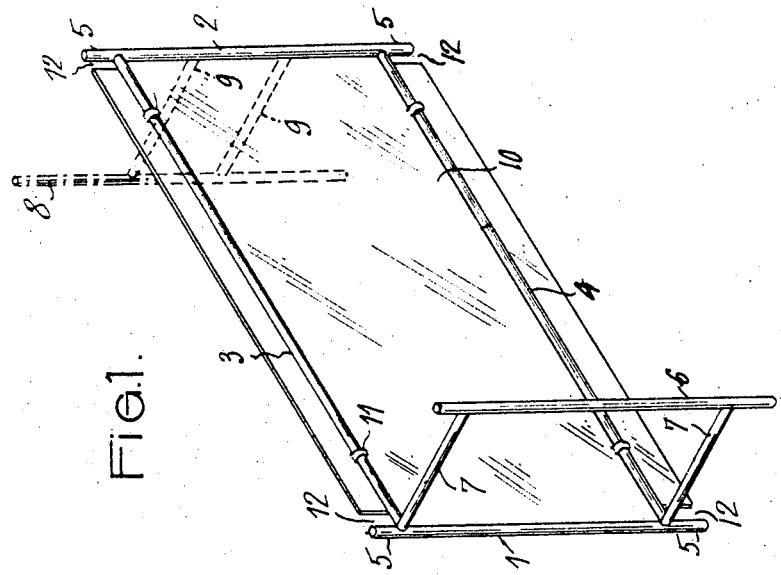
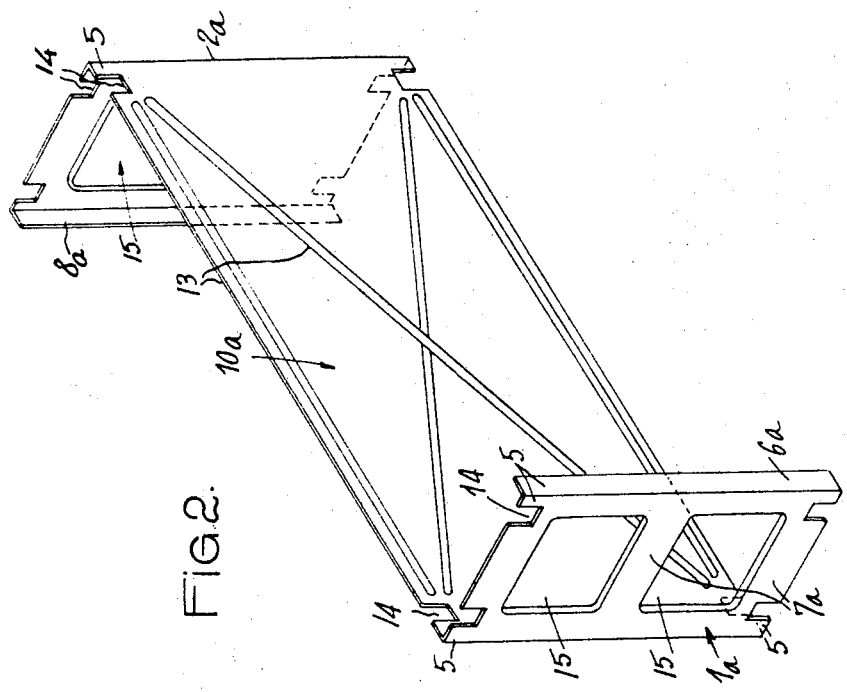
INVENTOR
JACQUES L. A. SEE
ATTYS.

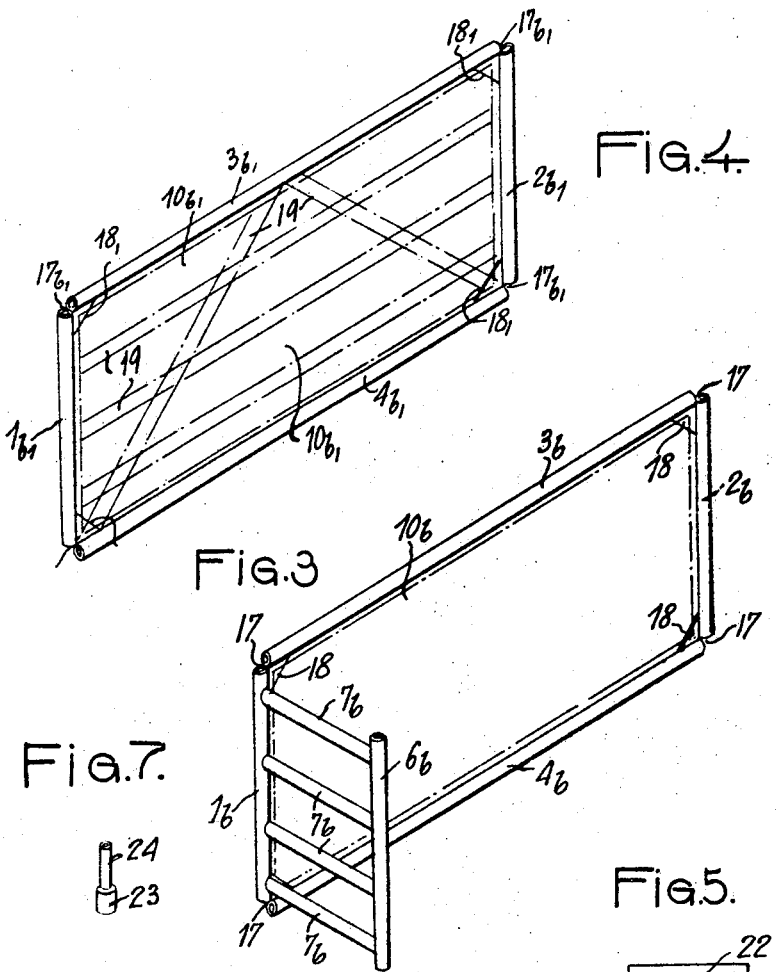

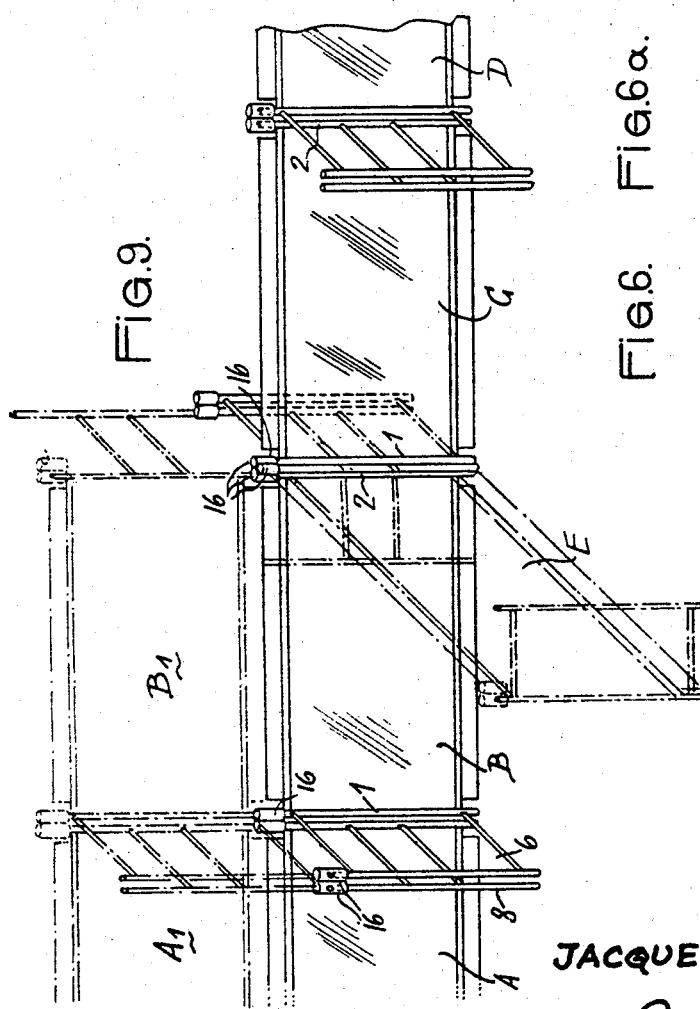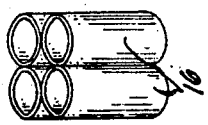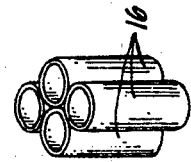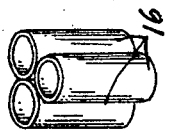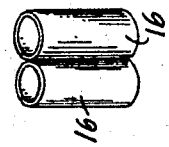
INVENTOR
JACQUES L. A. SEE

Sept. 24, 1968 J. L. A. SEE 3,402,787
SELF-SUPPORTING ELEMENTS FOR ERECTING
DISMANTLEABLE CONSTRUCTIONS
Filed Aug. 29, 1966 5 Sheets-Sheet 4
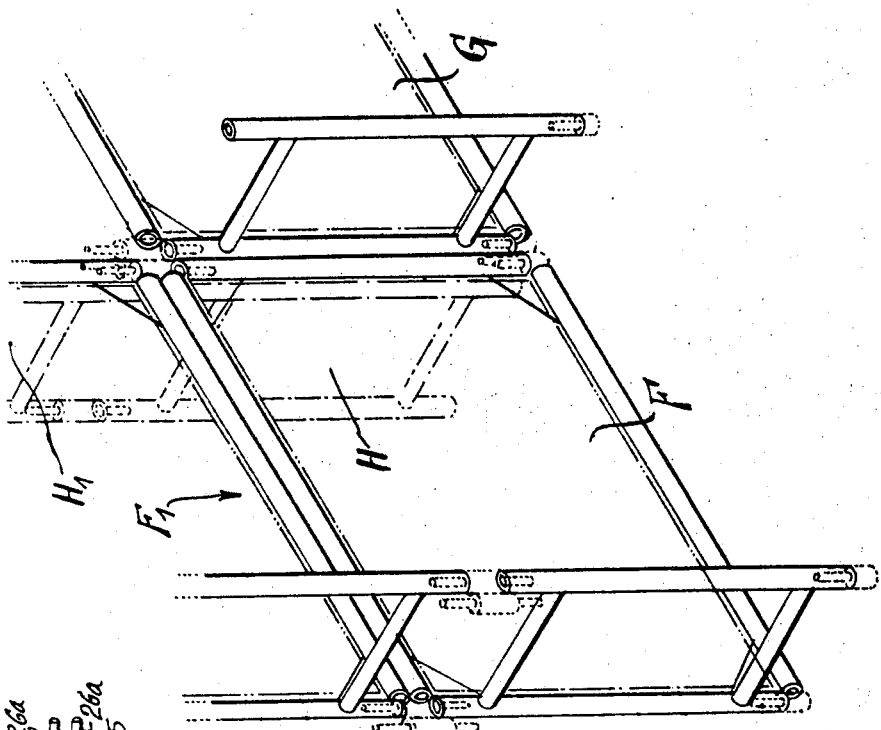
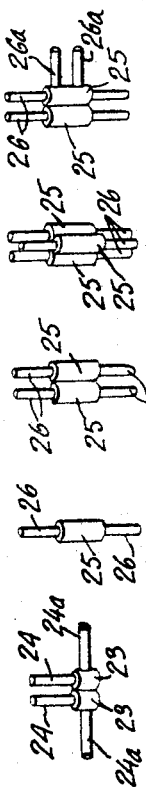
INVENTOR
JACQUES L. A. SEE
ATTYS.

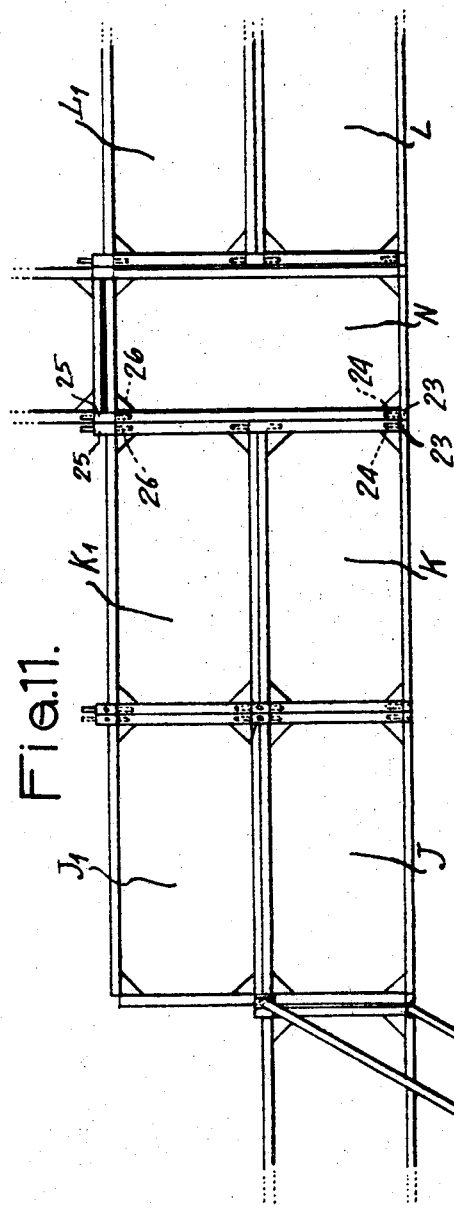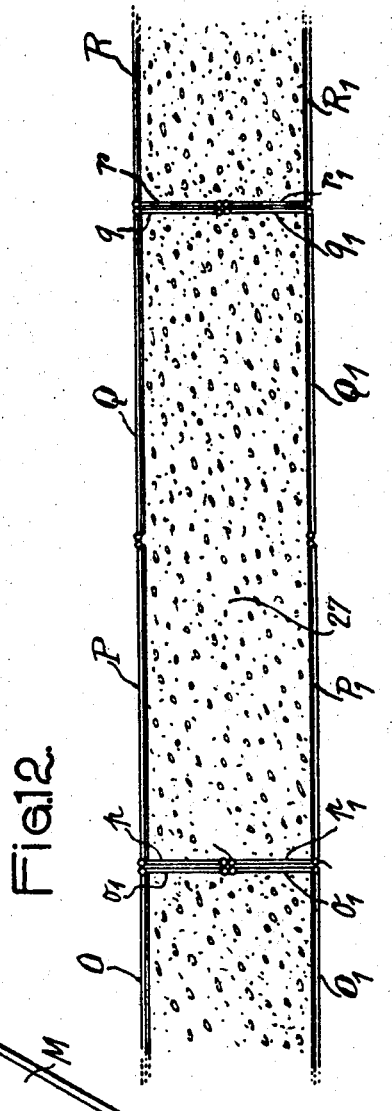

United States Patent Office
3,402,787
Patented Sept. 24, 1968

3,402,787
SELF-SUPPORTING ELEMENTS FOR ERECTING
DISMANTLEABLE CONSTRUCTIONS
Jacques Léon Alexandre See, 47 Rue Guersant,
Paris 17eme, France
Filed Aug. 29, 1966, Ser. No. 575,815
Claims priority, application France, Nov. 1, 1965,
30,156; Feb. 11, 1966, 49,226; June 2, 1966, 63,932
10 Claims. (Cl. 182—118)

The invention relates to prefabricated elements in the form of panels that can be assembled together by connecting members interlocking enabling the rapid erection and dismantling of constructions in partition form, making it possible to fight against fires, particularly forest or warehouse fires, and forming a screen against the spreading of fire or making possible the erecting of coffer-dams that can be filled with sand or earth for fighting against floods.

The particular embodiment of the invention means that the new elements that it creates and very simple to operate and so light of construction that they can be easily conveyed to the place where the fire is situated, either by lorry or eventually by helicopter, for these elements can be grouped together in compact packages; their shape makes it possible for them to be self-interlocking.

Another advantage of the invention lies in the fact that the new elements that it creates possess their own stability, enabling them to be very easily positioned without their being held up during the erection of the construction, so that the erecting of a construction becomes possible, even eventually by one man.

Still another advantage of the invention lies in the fact that a partition, even a high one, erected by means of the elements according to the invention, can be climbed over without using objects such as ladders. Consequently, persons who might eventually be isolated by a partition erected in front of a forest fire and are on the fire side could even climb over said partition to escape from the fire.

According to the invention, the prefabricated self-supporting elements forming a protecting panel for erecting partitions is characterized in that it comprises a frame partitions is characterized in that it comprises a frame comprising four rectilinear sections delimiting a rectangle covered by a solid panel, one at least of the sections being rigidly connected by cross bars to an auxiliary section to delimit at least one ladder element extending appreciably at right angles to the plane of the panel and at least two of said sections, likewise the auxiliary section, forming inserting tips for connecting members by insertion so that any number of identical elements can be assembled together.

Various other characteristics of the invention will moreover be revealed by the detailed description which follows.

Forms of embodiment of the invention are shown, by way of non-restrictive example in the attached drawings.

FIGURES 1 to 3 are perspective views showing three variants of the element according to the invention.

FIGURES 4 and 5 are perspective views of the two complementary construction elements.

FIGURES 6 to 6c are perspective views of connecting members for elements according to FIGURES 1 and 2.

FIGURES 7 to 7d and 8 to 8c are perspective views of connecting members for the elements of FIGURES 3 to 5.

FIGURE 9 is a perspective view of a fire-guard employing the elements of FIGURE 1.

FIGURE 10 is a partial perspective view of a fire-guard employing the elements of FIGURES 3 and 5.

FIGURE 11 is an elevation of a fire-guard employing the elements of FIGURES 3 and 4.

FIGURE 12 is a plan view from above showing how the elements of FIGURES 1, 2 and 3 can be used for erecting a dam.

The element of FIGURE 1 comprises a tubular frame with uprights 1, 2 connected by crossbars or frame members 3, 4 with projecting parts 5 at the ends of each upright. At least one upright 1 is connected to an auxiliary upright 6 of the same length, by auxiliary crossbars 7 extending at right angles in relation to the crossbars 3 and 4. In a similar manner, if so required, the upright 2 is connected to an auxiliary upright 8 by auxiliary crossbars 9, also at right angles in relation to the crossbars 3, 4 but staggered in height. The main uprights 1 and 2 with their respective auxiliary uprights 6 and 8 and their auxiliary crossbars 7 and 9 which connect them, thus form elementary ladders. The rectangle delimited by the uprights 1, 2 and crossbars 3, 4 is covered by a solid panel 10, preferably of thin sheet-iron, when the elements must be used as fire-guard partitions. The panel 10 can be permanently fixed by weldings or removably attached by lugs 11 or any other kind of fixing members. Notches 12 are made at the four corners of the panels 10 for positioning the connecting members described hereafter.

The element according to FIGURE 2 has the same characteristics but is formed by bending from a steel panel 10a with strengthening ribs 13, notches 14 for delimiting the projecting parts 5 and openings 15 for delimiting both the main uprights 1a, 2a and auxiliaries 6a, 8a as well as the auxiliary crossbars such as 7a.

To assemble the elements together formed as in FIGURE 1, or in FIGURE 2, connecting members are employed of which a certain number are shown in FIGURES 6 to 6c. These connecting members are formed by coupling-sleeves 16 having a height double that of the projecting parts 5. These coupling sleeves can be fixed in pairs as FIGURE 6, three by three as in FIGURE 6a or four by four as in FIGURES 6b and 6c which respectively show that said coupling-sleeves can be arranged cross-shaped or in a square.

FIGURE 9 shows a partition erected with the elements of FIGURE 1. This construction would be identical with the elements of FIGURE 2. Elements A, B, C, D are arranged on the ground without any particular precaution as these elements are stable owing to the fact that they comprise auxiliary uprights 6 and eventually 8. The junction of contiguous elements is ensured by means of the coupling-sleeves 16 as in FIGURE 6, slipped, on the one hand, on the main uprights, and on the other hand, on the auxiliary uprights.

If the construction erected must be of great height, there is arranged transversely, for example, to the element B and at its junction with the element C, an identical element E which is connected to said elements B and C by a three coupling-sleeve member 16. Then, above the elements A, B, etc., a new row of elements $A_1$, $B_1$, etc., is mounted. As shown in the drawing, the elementary ladders formed by each element are superimposed one to the other, so that continuous ladders are available along the entire height of the construction and on either side of the latter if provision is made so that each element comprises two elementary ladders.

FIGURE 3 shows a variant of the construction element, which is generally preferred according to the invention as it enables a greater number of mounting combinations than the elements according to FIGURES 1 and 2.

According to this variant, the element is formed by a frame comprising two main tubular uprights 1b, 2b, connected to two main tubular crossbars 3b, 4b. These uprights and crossbars are respectively arranged so that their ends are flush with one another to delimit notches 17 at the four corners of the frame. The connection between uprights and crossbars can be effected in various ways, by means of gussets 18, for instance. The upright 1b is conected to an auxiliary upright 6b of the same length by auxiliary crossbars 7b to delimit an elementary ladder. A panel 10b if thin sheet-iron, able to be ribbed, completely fills up the space delimited by the uprights 1b, 2b and cross bars 3b, 4b. The element of FIGURE 3 comprises only one ladder for there is supplementarily provided complementary accessories shown in FIGURES 4 and 5. According to FIGURE 4, the complementary element is formed like that of FIGURE 3, but with a ladder, consequently, its constitutive parts are designated as in FIGURE 3, with the same reference numerals, to which the subscript 1 has been added. Moreover, on this element, the reference numeral 19 designates strengthening parts which are shown by broken lines, as they are not always necessary.

According to one characteristic of the invention, the length of the crossbars 3b, 4b or 3b₁, 4b₁ is double that of the uprights 1b, 1b₁, 2b, 2b₁ to enable the mounting of elements in either direction and which can be adapted to other identical elements placed in either direction.

The complementary elements according to FIGURE 5 consist of a ladder element comprising two uprights 20, 21 and two crossbars 22 able to be placed as shown by the solid line, or as shown by the broken line.

To ensure the junction between them of elements like those of FIGURES 3, 4 and 5, connecting members are used of which a certain number of embodiments is shown in FIGURES 7 to 8c. Firstly, FIGURES 7 to 7d show connecting members that must be used at the bottom part of a construction. These elements comprise a cylindrical body 23 whose height is equal to the diameter and whose diameter is also equal to that of the tubes forming the frame making the uprights 1b, 2b and crossbars 3b, 4b. Each body 23 is provided at one end with a finger or pin 24 able to be inserted in the consecutive tubes of uprights and crossbars above. FIGURES 7a, 7b show two-body connecting members 23 and with three or more bodies 23 that are provided, the bodies being integral with each other, for example, by welding, and each of them comprising a projecting finger 24. FIGURE 7c shows that an auxiliary finger 24a can also be provided starting from the body 23 to enable right-angle assemblies. FIGURE 7d shows that two members, identical to FIGURE 7c can be integral between them for other particular assemblies.

As can be seen from the drawing, when the finger or pin 24 of one of the bodies is engaged in an upright 1b, 2b, or a crossbar 3b, 4b, the corresponding body 23 completely fills the corresponding notch 17. This enables connecting in a jointed manner of successive elements placed on the ground by ensuring the closing of the notches to obtain a strictly continuous partition. To connect elements together extending at two distinct levels, similar connecting members are used of which certain examples are shown in FIGURES 8 to 8c. These members comprise a body 25 of the same diameter as the body 23 of the members according to FIGURES 7 to 7d, but double the height. Furthermore, each body 25 is provided with at least two fingers or pins 26. As in the previous case, each connecting member may comprise one or more bodies as shown respectively in FIGURES 8a, 8b, each body comprising two pins 26.

FIGURE 8c shows that pins 26a can be supplementarily provided starting from certain bodies 25. It is obvious that other combinations of bodies and pins can be considered by technicians without altering the object of the invention.

FIGURE 10 shows how a partition is erected formed of elements such as those of FIGURE 3, respectively designated by F, G and F₁, as well as by complementary elements such as those of FIGURE 5, designated by H, H₁, and shown by broken lines so as to be more easily distinguished, whereas the connecting members are shown by dotted lines, to make the drawing easier to read.

FIGURE 11 shows a construction in which the elements like those of FIGURE 3, designated by J; K and L, and J₁, K₁ and L₁ are mounted together to form a partition whose stability is made greater by utilizing a complementary element like that of FIGURE 4, which is designated by M, and by also utilizing another element like that of FIGURE 4, designated by N, but placed vertically and connected to the elements K and K₁, on the one hand, by a two-body connecting member 23 and two pins 24, and on the other hand, by a two-body connecting member 25 and provided with pins 26, so that this N element can pivot around one of the pins 24 and one of the pins 26 which act like door hinges.

FIGURE 12 shows another application of the elements of the invention, these elements being those formed in FIGURE 1, FIGURE 2 or FIGURE 3. According to this figure, elements O, P, Q, R and O₁, P₁, Q₁, R₁, with their respective elementary ladders o, p, q, r and o₁, p₁, q₁, r₁, are respectively mounted in opposition to one another and thus form successive coffer-dams separated by partitions which form respective elementary ladders. In filling the coffer-dams with sand or earth or another product, as shown at 27, dams can thus be produced, for example, for protection against floods.

It is obvious that very numerous other assembly combinations can be considered with the means described in the foregoing, and it seems unnecessary to show these other assembly combinations because they solely depend on requirements that may arise and do not necessitate any modification of the means shown and described in the drawings.

I claim:

1. Prefabricated self-supporting element forming a protecting panel for erecting partitions, coffer-dams and other dismantleable constructions, characterized in that it comprises a frame comprising four rectilinear sections delimiting a rectangle covered by a solid panel, one at least of the sections being rigidly connected by crossbars to an auxiliary section to delimit at least one ladder element extending appreciably at right angles to the plane of the panel and at least two of said sections, likewise the auxiliary section, forming inserting tips for connecting members by insertion so that any number of identical elements can be assembled together.

2. Prefabricated element according to claim 1, characterized in that the various sections are formed by metal sections of which two form uprights, and two crossbars or frame members, these two latter sections being connected to those forming an upright below the end of the latter to delimit the inserting tip intended to receive a coupling-sleeve forming a connecting member, the covering panel having notches at its corners, to enable the positioning of said coupling-sleeves and the auxiliary section being formed by an identical section to one of the uprights to which it is connected by two cross-bars.

3. Prefabricated element according to claim 1, characterized in that each element comprises two elementary ladders respectively formed by two auxiliary uprights respectively connected to the uprights by crossbars, the two said ladders respectively extending on either side of the plane defined by the frame of the element.

4. Prefabricated element according to claim 1, characterized in that the element is in one piece and produced by stamping and cutting out from a steel sheet in which longitudinal ribs delimit longitudinal segments, then in which the notches opening from the edges of said steel sheet which is bent at its two ends perpendicularly to its plane, delimit the sections forming uprights as well as the inserting projections, one at least of the bent parts of the steel sheet comprising slots for delimiting both one of the auxiliary sections and the connecting crossbars forming an elementary ladder.

5. Prefabricated element according to claim 1, characterized in that the element comprises a tubular frame of which the four sections are fixed together so that the ends of each tube section is flush with the end of two other tube sections while delimiting notches at the four corners of the element, and in that the connecting members for successive elements comprise cylindrical bodies of the same diameter as the tube sections of the frame whose height is respectively equal to the diameter and double the diameter of at least one finger or pin which can be engaged inside one of the tube sections projecting from the body of each of said connecting members.

6. Prefabricated element according to claim 1, characterized in that the tube sections are jointed together by gussets.

7. Prefabricated element according to claim 1, characterized in that the rectangle delimited by each element has a length double that of its width.

8. Prefabricated element according to claim 1, characterized in that the connecting members comprise several cylindrical bodies assembled together, each cylindrical body comprising at least one finger or pin projecting from one of its ends.

9. Prefabricated element according to claim 1, characterized in that the connecting members supplementarily comprise at least one finger projecting laterally from their bodies for making right-angle insertions.

10. Prefabricated element according to claim 1, characterized in that the panel covering the rectangle delimited by the frame is formed by a thin steel sheet.

References Cited

UNITED STATES PATENTS

| 1,980,055 | 11/1934 | Healy et al. | 61—34 |
| 3,037,588 | 6/1962 | Causey | 182—178 |

FOREIGN PATENTS

| 612,704 | 11/1960 | Italy. |
| 1,181,564 | 1/1959 | France. |
| 1,373,497 | 8/1964 | France. |

REINALDO P. MACHADO, *Primary Examiner.*